United States Patent [19]
Swinson, Jr.

[11] 3,861,044
[45] Jan. 21, 1975

[54] DENTAL FITTING PROCESS

[76] Inventor: William E. Swinson, Jr., 2083 Renault Ln., N.E., Atlanta, Ga. 30345

[22] Filed: July 16, 1973

[21] Appl. No.: 379,466

Related U.S. Application Data

[63] Continuation of Ser. No. 250,290, May 4, 1972, abandoned.

[52] U.S. Cl. .................................................. 32/17
[51] Int. Cl. ............................................. A61c 9/00
[58] Field of Search ................................. 32/2, 17

[56] References Cited
UNITED STATES PATENTS
3,419,891   12/1968   Cornell .................................. 32/2
3,559,288   2/1971   Rehberg et al. ..................... 32/2

Primary Examiner—Robert Peshock
Assistant Examiner—J. Q. Lever
Attorney, Agent, or Firm—Newton, Hopkins & Ormsby

[57] ABSTRACT

A process of fitting a tooth structure with prepared dental material, such as gold inlays or crowns. The process includes preparation of a tooth structure to remove undesirable portions of a tooth so that the tooth can receive prepared dental material complementary to the removed tooth portion. After the tooth is prepared, a representation of the tooth structure is produced, with the representation being automatically transferred to an automatically controlled machine tool, and wherein the automatically controlled machine tool is operable in response to receiving the representation to produce a prepared dental structure complementary to the removed tooth portion. The prepared dental structure is then fitted to the prepared tooth. In producing a dental structure such as a crown, a representation of the tooth structure is produced and transferred to the automatic controlled machine tool prior to preparation of the tooth, with a second representation produced and transferred to the automatic controlled machine tool after preparation of the tooth.

17 Claims, 5 Drawing Figures

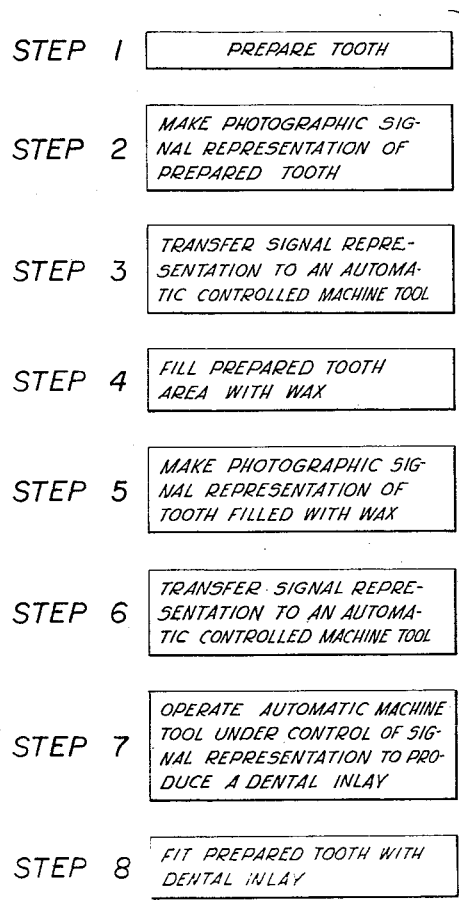

PATENTED JAN 21 1975 3,861,044

| STEP 1 | PREPARE TOOTH |
| STEP 2 | MAKE PHOTOGRAPHIC SIGNAL REPRESENTATION OF PREPARED TOOTH |
| STEP 3 | TRANSFER SIGNAL REPRESENTATION TO AN AUTOMATIC CONTROLLED MACHINE TOOL |
| STEP 4 | FILL PREPARED TOOTH AREA WITH WAX |
| STEP 5 | MAKE PHOTOGRAPHIC SIGNAL REPRESENTATION OF TOOTH FILLED WITH WAX |
| STEP 6 | TRANSFER SIGNAL REPRESENTATION TO AN AUTOMATIC CONTROLLED MACHINE TOOL |
| STEP 7 | OPERATE AUTOMATIC MACHINE TOOL UNDER CONTROL OF SIGNAL REPRESENTATION TO PRODUCE A DENTAL INLAY |
| STEP 8 | FIT PREPARED TOOTH WITH DENTAL INLAY |

FIG 1

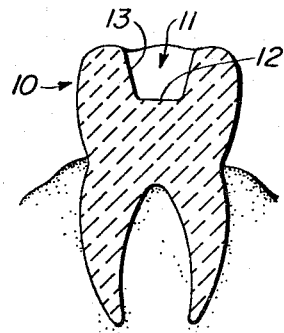

FIG 2

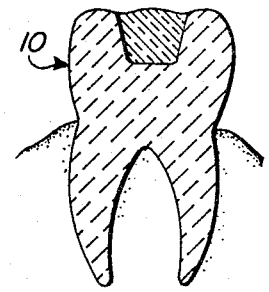

FIG 3

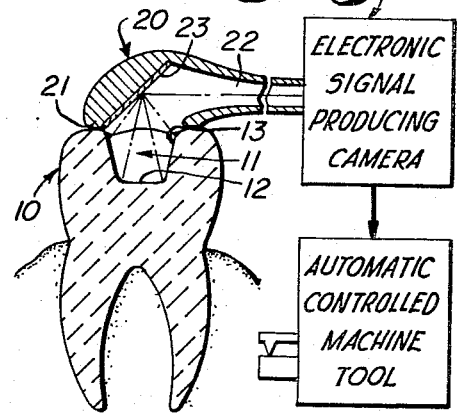

FIG 4

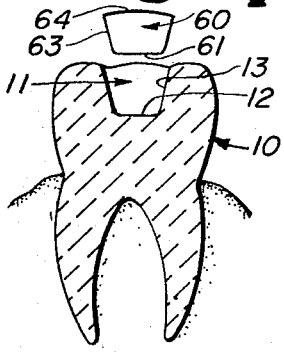

DENTAL FITTING PROCESS

This is a continuation, of application Ser. No. 250,290, filed May 4, 1972, entitled "Dental Fitting Process," now abandoned.

BACKGROUND OF THE INVENTION

This invention relates to the reconstruction of a tooth structure and is more particularly concerned with a process of fitting a tooth with prepared dental material such as a gold inlay or crown.

Due to the break-down of our teeth structure, it is often desirable to restore the teeth by adding prepared dental accessory material, such as gold inlays. It is a well-known practice to fit a tooth with a gold inlay. However, the prior art method of fitting a tooth with a gold inlay requires the dentist to effect preparation of the tooth for receiving the gold inlay, after which an impression of the preparation is made using either a direct mold impression technique or an indirect mold impression technique. After the impression is made, the mold of the teeth is poured up, the die is trimmed and then a mold is prepared by investing the pattern in conventional investment material. The investment of the pattern is normally done at a laboratory remote from the dental office and requires a time consuming process for pouring up impression, trimming die, making wax pattern, mixing the dental investment material, investing the wax pattern in a casting ring, curing the investment material, and then removing the wax pattern by heating. After the wax pattern has been removed by heating, gold alloy is heated and then cast into the mold made by the wax pattern. After the gold casing has sufficiently cooled and pickled, the casting is removed and polished.

One problem with the above described prior art method of preparing a gold inlay is that the dentist effects the tooth preparation and wax impression in his office in the presence of the patient and then the wax impression is shipped to a remote laboratory facility for making of the gold inlay. Since it takes considerable time for preparation of a gold inlay, in a manner as described above, the patient is required to return to the dentist office at a later date so that dentist can fit the tooth preparation with the gold inlay received from the laboratory.

Another problem with the above described method of preparing gold inlays is that due to the shrinkage of the wax impression and the expansion of the investment material in the preparation process, the finished gold inlay does not always fit properly, requiring the dentist to make a number of adjustments on the inlay or sometimes it is necessary to repeat the impression for a subsequent laboratory casting of a second inlay.

Since the prior art method of preparing gold inlay requires a considerable amount of time and effort, this process is expensive to use.

SUMMARY OF THE INVENTION

The above disadvantages have been overcome by the present invention which basically includes the steps of effecting preparation of a tooth for receiving a dental inlay, producing a signal representation of the prepared tooth preparation and automatically transferring the signal representation to an automatic controlled machine tool which will automatically machine an inlay complementary to the tooth preparation in response to receiving the signal representation.

One important feature of the present invention is that the entire process of producing a gold inlay can be reduced to a matter of minutes and can be produced either in a remote location or prepared on site in the dental office.

A further feature of the present invention utilizing a signal representation and automatic controlled machine tools is that a gold inlay can be produced which will accurately fit a tooth preparation.

It is therefore a primary object of the present invention to provide a process of fitting a prepared tooth structure with an accurately fitting inlay in a minimum amount of time.

An additional object of the present invention is to provide a process of fitting a prepared tooth with a dental inlay which is simple to use, inexpensive, and reliable in performance.

These and other objects and advantages of the details of construction will become apparent after reading the following description of the illustrative embodiments, with reference to the attached drawings wherein like reference numerals have been used to refer to like parts throughout the drawings, and wherein:

BRIEF DESCRIPTION OF THE DRAWINGS

FIG. 1 is a schematic block diagram showing the steps utilized in the process embodying the principles of the present invention;

FIG. 2 is a vertical sectional view showing a tooth having a tooth preparation;

FIG. 3 is a vertical sectional view showing a prepared tooth fitted with wax for producing the upper finished tooth surface;

FIG. 4 is a vertical sectional view showing a prepared tooth being photographed to produce a signal representation of the prepared tooth as required by Step 2 of the process; and, FIG. 5 is a vertical sectional view showing the prepared tooth structure being fitted with a machined dental inlay.

DESCRIPTION OF THE ILLUSTRATIVE EMBODIMENT

Referring now to the drawings, the process embodying the principles of the present invention is shown in block diagram in FIG. 1 and includes the following steps:

Step 1 requires a tooth structure to be prepared removing certain portions of the tooth to produce an area in which a dental casting is to be fitted.

Step 2 requires the prepared tooth to be photographed to produce a photographic signal representation of the prepared tooth of the side and bottom wall dimensions.

Step 3 requires the prepared tooth to be fitted with wax and the upper surface of the wax carved to produce a desired tooth upper surface.

Step 4 requires the carved upper wax tooth surface to be photographed to produce a photographic signal representation of the shape and height of the desired tooth upper surface.

Step 5 requires the photographic signal representation of Steps 2 and 4 to be transferred to an automatic controlled machine tool.

Step 6 requires the automatic controlled machine tool to be operated under control of the photographic signal representations to machine an inlay complementary to the prepared tooth portion.

Step 7 requires the fitting of the machine inlay to the tooth preparation.

As shown in FIG. 2, a tooth in which a prepared inlay is to be fitted is generally represented by the reference numeral 10 and is prepared by producing a recessed area 11 in the tooth. In the preparation of recessed area 11, the recess is formed to include a bottom surface 12 and a number of upwardly diverging sidewalls 13. The diverging sidewalls 13 will permit the wax pattern to be easily removed and the machined inlay to be readily fitted into the recess 11. Further, the angled sidewalls allow the photograph to reflect the angles of the sidewalls so that the proper dimensions of the recess can be calculated in the signal representation of the recess.

After the recess 11 has been prepared, the recess is photographed by a photographing head 20. Photographing head 20 is miniaturized so that the head can be inserted in a patients mouth at a number of tooth locations and can be accurately positioned relative to the upper surface of a tooth structure for photographing the tooth in a manner as shown in FIG. 4. The photographing head 20 includes a peripheral base portion 21 adapted to contact the upper tooth structure 10. Photographing head 20 includes a light reflecting passageway 22 which is provided with an angled reflecting mirror 23. Angled reflecting mirror 23 is operatively associated with passageway 22 for reflecting light rays produced by conventional camera equipment 30 so that the light rays can be reflected off of the angled cavity walls 13 and bottom wall 12 to produce a photographic signal representation of the prepared tooth.

After the prepared tooth has been photographed, the recess 11 is fitted with wax material and the upper surface of the wax is carved to produce the desired tooth upper surface. The tooth upper surface is then photographed by photographing head 20 to produce a photographic signal representation of the shape of the desired tooth upper surface and to be used for calculation of the vertical dimensions of the needed inlay.

When the photographic signal representations have been processed by conventional processing techniques, the photographic signal representations are transferred by conventional electronic signal means to an automatic controlled machine tool generally represented by the reference numeral 40. The automatic controlled machine tool 40 is of conventional construction and is readily available in the machine tool art. The automatic controlled machine tool 40 is operable for receiving the electronic signals of the graphic representation from camera equipment 30 and for utilizing these electronic control signals to automatically operate a machine tool cutting means 41 to machine a gold alloy element 50 to produce a finished gold inlay 60 complementary to the prepared tooth recess 11. The machined gold inlay 60 will include a base portion 61, a number of upwardly diverging sidewalls 63 complementary to sidewalls 13 and will include a top surface 64 which is shaped to conform to the desired tooth upper surface that was formed on the wax fitted into the recess 11 in Step 3.

As shown in FIG. 5, after the gold inlay 60 has been machined, the inlay is fitted within the tooth recess 11 and secured thereto by conventional dental adhesive material. If necessary, the gold inlay 60 is carved on the top surface 64 by a conventional dental cutting tool so that the upper surface 64 of the gold inlay will be aligned with the patient's normal teeth bite registration.

It is also possible to utilize the above described process for fitting a patient with a multiplex prepared dental material, such as a crown. In utilizing this process in the preparation and fitting of a multiplex prepared dental material, the patient's teeth structure is photographed to produce a photographic signal representation of the teeth structure prior to removing any portion of the tooth. The purpose of photographing the teeth structure prior to preparing the teeth is so that a graphic signal representation of the original dimensions of the teeth structure can be integrated with the graphic representation of the prepared teeth structure so that the automatic controlled machine tool can machine an inlay having the dimensions of the teeth structure removed in a preparation operation.

Even though the above described process includes the preparation of a gold inlay, it is obvious that an inlay constructed of a number of other suitable dental materials, which could be machined by automatic controlled machine tools, could be utilized in place of gold.

Further, other means, such as sound or laser beams, can be utilized to produce a signal representation of the teeth structure as required in Steps 2 and 4.

It now becomes apparent that the above described illustrative embodiment is capable of obtaining the above stated objects and advantages. It is obvious that those skilled in the art may make modification in the details of construction without departing from the spirit of the invention which is to be limited only by the scope of the appended claims.

What is claimed is:

1. A process of fitting a tooth with dental inlay material, such as gold, including:
    a. effecting a tooth preparation which is to receive a dental inlay;
    b. producing a signal representative of said tooth representation;
    c. transferring said signal representation to an automatically controlled machine tool;
    d. automatically operating said machine tool under control of said signal representation to produce an inlay complementary to said tooth preparation; and
    e. fitting said machine inlay to said tooth preparation.

2. A process as defined in claim 1 further characterized in that said dental inlay material is in gold.

3. A process as defined in claim 1 further characterized in that said signal representation is produced by photographing said tooth preparation to produce a photographic signal representation of said tooth preparation.

4. A process as defined in claim 3 further characterized in that said photographic signal representation is automatically transferred to said automatically controlled machine tool.

5. A process as defined in claim 4 further characterized in that said machine tool is automatically initiated to prepare said inlay in response to receiving said photographic signal representation.

6. A process of preparing dental inlay material for use in fitting a tooth preparation, including:
    a. producing a signal representation of a tooth preparation;
    b. transferring said signal representation to an automatically controlled machine tool; and c. operating said machine tool under control of said signal representation to produce an inlay complementary to said tooth preparation.

7. A process as defined in claim 6 further characterized in that said signal representation is produced by photographing said tooth preparation to produce a photographic signal representation of said tooth preparation.

8. A process as defined in claim 7 further characterized in that said photographic signal representation is automatically transferred to said automatically controlled machine tool.

9. A process as defined in claim 8 further characterized in that said automatically controlled machine tooth is initiated to machine an inlay in response to receiving said photographic signal representation.

10. A process as defined in claim 9 further characterized in that said inlay is prepared of gold.

11. A process of fitting teeth structure with prepared dental material, including:
   a. producing a signal representation of teeth structure which is to be fitted with prepared dental material;
   b. preparing said teeth structure to receive prepared dental material;
   c. producing a signal graphic representation of said teeth after being prepared for receiving prepared dental material;
   d. transferring both of said signal representations of said teeth structures to an automatically controlled machine tool;
   e. operating said machine tool under control of said two signal representations to produce a machined dental structure complementary to said teeth structure removed in said preparation; and
   f. fitting said prepared dental material to said prepared teeth structure.

12. A process of preparing an insert for use in a recessed area, including:
   a. producing a signal representation of said recessed area;
   b. transferring said signal representation to an automatically controlled machine tool; and
   c. operating said machine tool under control of said signal representation to produce an insert complementary to said recessed area.

13. A process as defined in claim 12 further characterized in that said signal representation is produced by photographing said recessed area to produce a photographic signal representation of said recessed area.

14. A process as defined in claim 13 further characterized in that said photographic signal representation is automatically transferred to said automatically controlled machine tool.

15. A process as defined in claim 14 further characterized in that said automatically controlled machine tool is initiated to machine said insert in response to receiving said photographic signal representation.

16. A process of forming a dental inlay to fit a tooth preparation comprising the steps of:
   a. developing a signal from the tooth preparation and
   b. applying the signal to an automatically controlled machine tool to produce said inlay.

17. The process of claim 16 comprising the further step of producing the tooth preparation to produce said signal.

* * * * *